Aug. 19, 1924.
A. B. CADMAN
1,505,372
TRAILER TRUCK
Original Filed April 7, 1920. 2 Sheets-Sheet 1
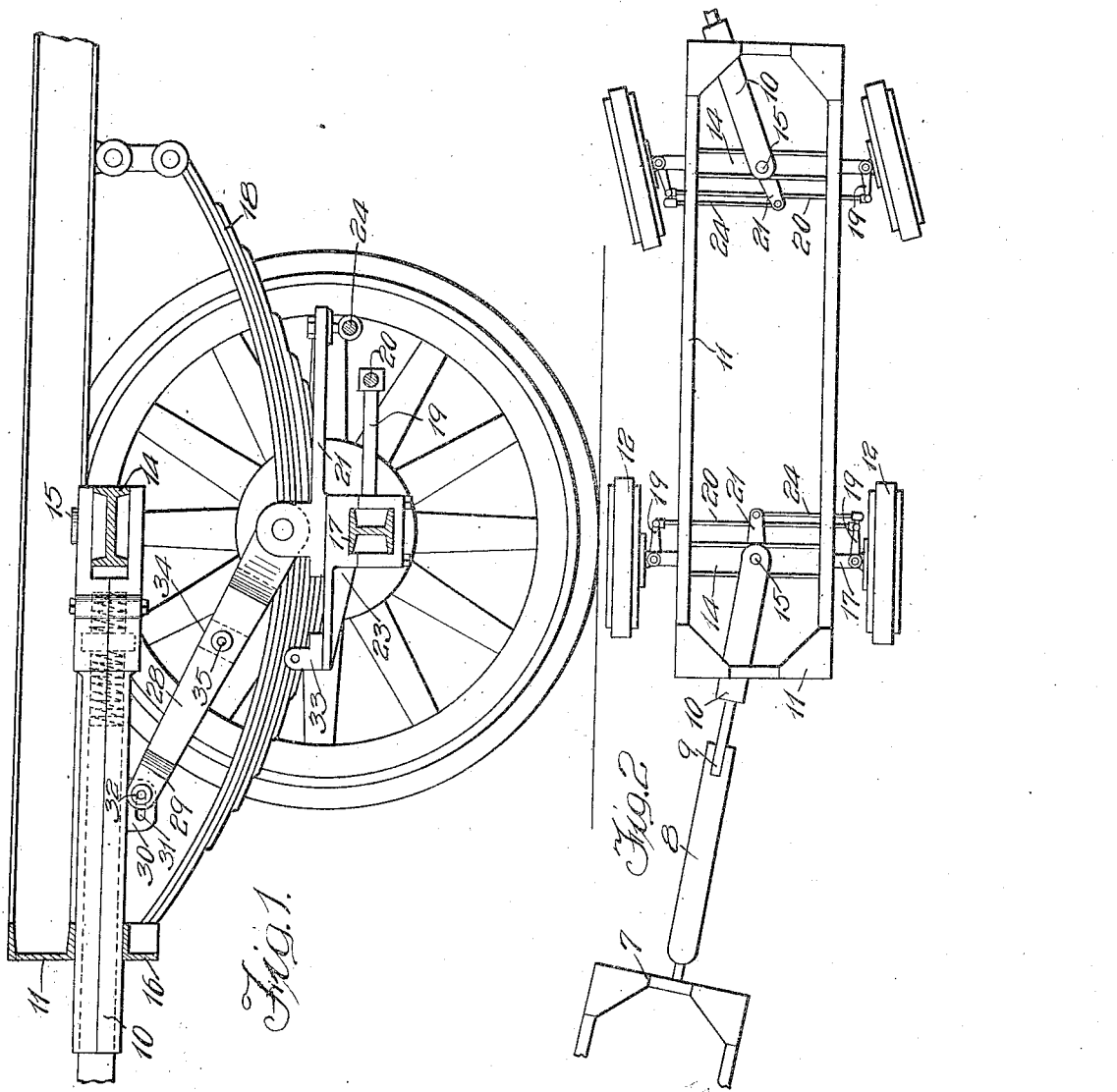

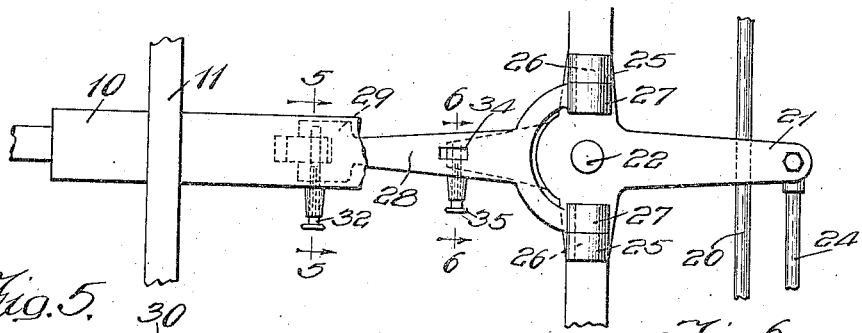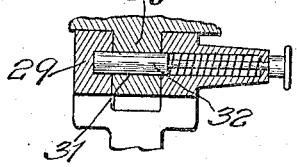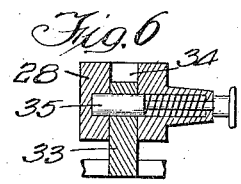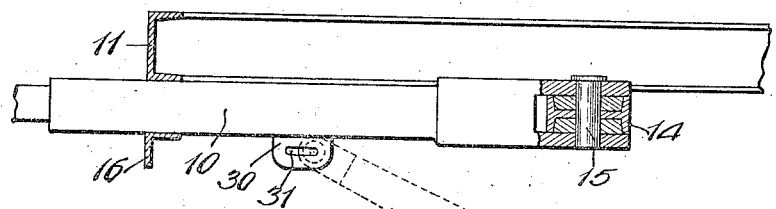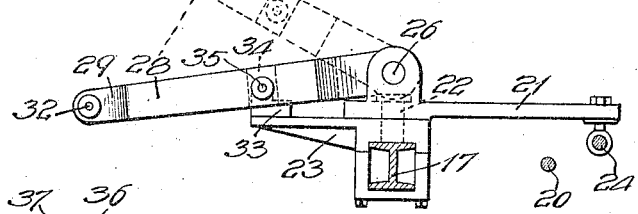

Patented Aug. 19, 1924.

1,505,372

UNITED STATES PATENT OFFICE.

ADDI BENJAMIN CADMAN, OF BELOIT, WISCONSIN, ASSIGNOR TO WARNER MANUFACTURING COMPANY, OF BELOIT, WISCONSIN, A CORPORATION OF WISCONSIN.

TRAILER TRUCK.

Application filed April 7, 1920, Serial No. 371,842. Renewed July 7, 1922. Serial No. 573,455.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer Trucks, of which the following is a specification.

This invention relates to steering mechanism for a four-wheel trailer truck of the reversible type, that is to say, wherein the truck may be drawn and steered from either end, the front pair of wheels being attached to the draw bar to be steered thereby while the rear pair of wheels is locked in position parallel to the body frame of the truck.

In moving a trailer truck of this character into and out of positions to load and unload the same, it is frequently necessary to back up the trailer and the drawing unit (usually a motor truck), and it may often be necessary to back from the street into an alley running at right angles thereto or even to back the motor truck and trailer through a sinuous path in order to get around other trucks, railroad cars, loading platforms, or other obstacles.

In order to obtain the maximum flexibility and to facilitate the operation under conditions such as described, it is desirable that the steering device which connects the draw-bar to the wheels be capable of being disconnected so that the wheels may, at times, be locked in position parallel to the body frame or perpendicular to the axle, and may, at other times, be connected to the draw-bar to be steered thereby, and may, at still other times, be disconnected altogether so as to allow the wheels to be manually swung by the operator.

To facliitate an understanding of the purposes of such a construction it may be said that when the trailer is being drawn forwardly the front wheels are connected to the draw-bar to be steered thereby while the rear wheels are locked in position parallel to the body frame. When the trailer is being backed, the front wheels, i. e., the wheels near the motor truck, are detached from the draw-bar and locked in position parallel to the body frame so that they will run in a straight line, leaving the draw-bar which is attached to the motor truck free to swing through its full arc without affecting these wheels. At the same time the rear pair of wheels (now the leading wheels in backing) are unlocked from their position parallel to the body frame so that they may be manually steered by the operator to lead the trailer and motor truck in the desired path.

It may frequently be necessary to stop backing and pull ahead a short distance to reposition the truck and trailer for further backing. When this is to be done, the rear wheels are again locked in position parallel to the body frame and the front wheels are unlocked from such parallel position and are connected to the draw-bar so as to be steered by the latter in pulling ahead.

It will be apparent that at the end of the previous backing operation the front draw-bar will frequently lie in angular position relative to the center line of the trailer so that it is impossible to connect the wheels to the draw-bar without shifting the wheels around into alinement with the draw-bar. It is an object of my invention to produce an improved construction which permits of unlocking the wheels from their position parallel to the body frame and manually swinging them into position parallel to the draw bar so that they may be connected to the latter preparatory to pulling ahead; also the reverse of this operation, that is to say, disconnecting the wheels from the draw-bar and swinging them into position parallel to the body frame to be locked in such position preparatory to another backing up operation.

Another object of the invention is to provide an improved steering gear of simple and durable construction having a minimum number of joints adapted to accommodate itself to all of the conditions hereinbefore mentioned and many other conditions encountered in practical use so as to facilitate to the maximum degree the moving of a trailer and its tractor into and out of difficult positions.

Another object of the invention is to provide a steering gear adapted for use in a trailer wherein the draw-bar is mounted on the body frame and said frame is supported upon the axles by springs and to arrange the steering gear so that the relative approaching and receding movements between the body frame and the axles will not affect the steering gear or change the positions or angularity of the wheels in any way.

A further object is to provide a trailer truck of the type just outlined in which the steering gear is mainly mounted on the axle and comprises a portion which extends upward for the connection to the draw-bar; and in which the steering gear or a portion thereof may be detachably locked directly to the axle, so that the wheels may be held in position parallel to the body frame or may be allowed to be swung, as may be desired, either by the draw-bar or manually by the operator independently of the draw-bar.

Another object of the invention is to provide in a trailer truck having a permanently mounted draw-bar and having an axle arranged with dirigible wheels, a wheel steering and locking means comprising two main parts, one of which is mounted on the mid-portion of the axle to swing on a vertical pivot and is at all times connected to the wheels, and the other of which parts is at all times connected to the first part and is mounted to swing up and down so that it may be locked either to the draw-bar or to a bracket rigid with the axle, at the will of the operator.

In the accompanying drawings Fig. 1 is a sectional elevation illustrating one end of a trailer truck embodying my invention.

Fig. 2 is a plan view showing somewhat diagrammatically a trailer truck connected with the rear portion of a motor truck or other tractor, and illustrating one position of the parts in the operation of backing the trailer, the wheels adjacent to the motor truck being locked parallel to the body frame leaving the draw-bar free to swing independently, while the rear wheels are left free to be swung manually by the operator in steering the trailer.

Figs. 3 and 4 are enlarged fragmentary detail views, in plan and sectional elevation respectively, showing the parts of the steering gear and wheel locking means.

Figs. 5 and 6 are sectional detail views taken in the planes of lines 5—5 and 6—6 respectively of Fig. 3.

Fig. 7 is a detail view of a supplementary hand-steering lever.

In the exemplary embodiment of the invention which is shown in the drawings, the trailer, aside from the steering gear, is of substantially the same construction as that shown in my prior Patent No. 1,245,676, issued November 6, 1917, to which reference may be had for general information as to the structure of this type of trailer.

Referring to Fig. 2 of the accompanying drawings, the reference numeral 7 designates a drawing unit or tractor which is connected by means of a link 8 and a coupling head 9 with the draw-bar 10 of a trailer truck which is constructed in accordance with my present invention. The body frame of the trailer is indicated by numeral 11 and the wheels by 12. The draw-bar is pivoted at its rear end to a cross piece 14 forming part of the body frame by means of a kingpin 15, the forward end of the draw-bar projecting through a slot or guideway formed between the end of the frame 11 and a supporting bar or rest 16 (Figs. 1 and 4) attached thereto. In the embodiment illustrated, the draw-bar is a permanently mounted draft means, and comprises an outer casing with an inner spring cushioned draft-bar, substantially as shown in my prior Patent No. 1,304,261, issued May 20, 1919.

The axles are designated 17 and the springs which support the body frame from the axles are indicated at 18. The wheels 12 are mounted upon stub axles which are pivoted on the ends of the main axle 17 and are provided with steering arms 19.

The means for connecting the draw-bar to the dirigible wheels for steering the latter, for locking the wheels at right angles to the axle, and for permitting manipulation of the wheels by hand will now be described. The two steering arms 19 of each pair of wheels are directly connected together by a single tie rod 20 which maintains the wheels in parallelism at all times. A lever 21 is mounted for pivotal movement upon a vertical kingpin 22 which is carried by a bracket 23 rigidly secured to the mid-portion of the axle 17. The lever 21 in the present instance is of T-shape, one arm of the lever extending at right angles to the axle 17 and being connected by a drag link 24 to an extension on one of the steering arms 19 of the wheels, suitable joints, such as ball and socket joints, being employed at the ends of said drag link. The other arms of the lever 21, which are in alinement with each other and overlie the axle, have bearings 25 at their ends to receive pivot pins 26 which pins also extend into bearings 27 on the forked end of a steering lever 28. The pins 26 may be fixed in either pair of bearings 25 or 27, being rotatable in the other bearings so as to permit of a swinging movement of the lever 28 up and down on said pins as an axis.

The free end of the steering lever 28 carries a locking device for detachable connection to the pivoted outer casing of the draw-bar, and which is adapted to permit of longitudinal movement between the steering lever and the draw-bar to compensate for the lost motion in the relative approaching and receding movements between the body frame and the axle due to deflection of the springs. In the present instance the lever 28 forms at its outer end a yoke 29 which embraces a depending ear 30 on the outer casing of the draw-bar having an elongated horizontal slot 31 therein. A removable pin, or spring detent 32, having bearings in the yoke 29 is provided to engage the ear 30, passing through the slot 31 and locking the steering lever to the draw-bar when it is desired to steer the wheels by means of the draw-bar. This form of connection, and the style of steering gear employed, permit of the movements of the frame and axle just mentioned due to spring deflection without in any way affecting the position or angularity of the wheels. The longitudinal movements of the spring cushioned inner member of the draw-bar, such as occurs in starting and stopping, have no effect upon the steering lever, by reason of the connecting device 30 being mounted on the outer casing which is permanently pivoted to the frame.

In order that the dirigible wheels may be locked in position at right angles to the axle, (parallel to the body frame) as is required for the rear or following wheels when moving the trailer in either direction, I have provided means for locking the steering lever 28 to the bracket 23 which is rigidly secured to the axle. Illustrative of such means, a lug 33 is formed on the bracket 23 adapted to engage a recess or slot 34 in the center portion of the lever 28, when the latter is detached from the draw-bar, brought to position at right angles to the axle and swung downward on its pivots. A removable pin or spring detent 35 is carried by the lever 28, arranged to pass laterally through the lever and the slot 34, and, when in position, to engage and pass through the lug 33, thus rigidly locking the steering lever and the wheels in position parallel to the body frame.

There is a considerable advantage in the construction heretofore described in being able to lock the wheels directly to the axle, in that rigidity of the alinement of the wheels is accomplished to a greater degree than is possible where the steering lever is locked to the body frame and influenced by the side swing of the intervening spring suspension.

I have further provided means for swinging the wheels independently of the position of the draw-bar, and for steering the trailer manually when so desired, as when backing over a tortuous path with an operator steering the leading wheels. Intermediate the two locking positions described for the steering lever 28, that lever may be laterally operated free from the axle bracket and from the draw-bar. In order to give increased leverage and easy accessibility for the operator, a supplemental hand steering lever 36—38 (Fig. 7) may be employed, having means for ready attachment to the steering lever 28, and extending beyond the end of the body frame. A suitable form of such supplementary hand lever may comprise a fork 36 adapted to engage the yoke 29 by snugly fitting between the arms of the yoke and extending over the upper and lower faces of its base. The whole may be locked in operative position by passing the detent 32 through a bore 37 in the fork 36. A handle 38 of lighter material and convenient length may be mounted in the fork.

In the operation or use of the trailer, the rear wheels are normally locked at right angles to the axle through the steering lever 28 which is locked to the axle by rigid engagement with the lug 33 and bracket 23. The front wheels are normally controlled by the draw-bar while the trailer is traveling forwardly by locking the front steering lever 28 to the draw bar as illustrated in the preceding description, the draw-bar and steering lever swinging laterally as a unit.

When it is desired to back up the trailer, the front wheels (now the following wheels) are locked at right angles to the axle by disconnecting the lever 28 from the draw-bar and lowering said lever into engagement with the stop device 33 on the bracket 23. The front draw-bar which is coupled to the motor truck is thus left free to swing laterally without affecting the wheels. The rear wheels (now the leading wheels in backing) may be manually steered by an operator by unlocking the lever 28 from the axle bracket 23 and locking it to the draw-bar, thus making it possible to control the steering lever by manually swinging the draw-bar. It is preferable, however, to disconnect the steering lever from both the draw-bar and the axle bracket and swing the lever by means of the supplemental hand steering lever 36—38 which increases the leverage and facilitates steering by hand.

It is sometimes necessary after backing up to pull ahead a short distance so as to straighten out the motor truck preparatory to further backing and when this is to be done the rear wheels of the trailer are again locked at right angles to the axle while the front wheels are unlocked by raising the lever 28 and securing said lever to the draw-bar by the locking device 29—32. It usually happens at the end of the backing up operation, that the front draw-bar which is attached to the motor truck extends at an angle to the longitudinal center line of the trailer so that when the lever 28 is vertically out of engagement with the locking device 33 to 35 on the axle it is not in the proper position to connect the locking device on the draw-bar. The lever and the wheels therefore must be swung laterally to position the lever directly beneath and in general alinement with the draw-bar 10 in order to lock the lever to the draw-bar. This operation is very easily performed with the steering gear herein shown and the reverse of the operation is equally easy, that is to say, the detachment of the lever 28 from the draw-bar when extending at an angle to the center line and the movement of the lever into position beneath the center line so as to engage with the device 33 for locking the wheels to the axle.

My construction allows for a variety of relationships of the various parts to facilitate the performance of their duty under the varying conditions of use.

My construction also embodies great simplicity of parts and provides a strong durable construction having a minimum number of joints and bearings which materially reduces the possibility of looseness and play in the steering gear.

While I have shown a preferred embodiment of my invention in the drawings and have described the same in considerable detail, I recognize that many modifications may be made without departing from the spirit and scope of the invention and therefore do not intend to limit the invention to the construction disclosed except as specified in the appended claims.

I claim as my invention—

1. A trailer truck having, in combination, a body frame, an axle having swiveled carrying wheels thereon, springs supporting said frame on said axle, a draw bar pivotally mounted on said frame, a steering lever pivoted on a vertical axis on said axle and connected with said wheels, a second lever having its front end detachably connected to said draw bar at a point inward from the end of said body frame and having its rear end connected to said steering lever to rock up and down thereon but to cause rotation of said steering lever about its axis, and means rigid with said axle with which said second lever is arranged to interengage when detached from the draw bar whereby to hold the wheels at right angles to the axle.

2. A trailer truck having, in combination, a body frame, a main axle having swiveled carrying wheels thereon, springs supporting said frame from said axle, a draw bar comprising an outer housing section pivotally mounted on said frame and an inner section slidable longitudinally within the outer section, and steering means comprising two main parts, one part of which is mounted on the axle to swing on a vertical pivot and is connected to the wheels for swinging the latter, the other part of which is mounted on the first part to swing therewith and also to swing up and down with relation thereto, means providing a direct detachable connection between the free end of the second mentioned part and the outer section of said draw bar, and means on said axle with which the second mentioned part is arranged to interengage when detached from the draw bar and swung downwardly whereby to lock the wheels at right angles to the axle.

3. A trailer truck having a body frame which carries a pivoted draw bar and an axle which is equipped with dirigible wheels, in combination with a steering lever pivoted on the mid portion of said axle to swing on a vertical axis and connected to said wheels, a second lever pivotally attached to the first lever to swing therewith and also to swing up and down with relation thereto, means for locking the second lever directly to the axle to prevent swinging of said wheels, a depending lug on said draw bar, a fork on the upper end of the second lever adapted to embrace said lug, the lug having an elongated slot therein and a bolt carried by said fork and adapted to pass through said slot.

4. A trailer truck having a body frame which carries a pivoted draw bar and an axle which is equipped with dirigible wheels, in combination with a steering lever pivoted on the mid portion of said axle to swing on a vertical axis and connected to said wheels, a second lever pivotally attached to the first lever to swing therewith and also to swing up and down with relation thereto, means for locking the second lever directly to the axle to prevent swinging of said wheels, and means for detachably locking the upper end of the second lever to said draw bar comprising interengaging parts on these two members, one of which parts has a slot and the other of which parts has a bolt to pass through said slot and allow lost motion.

5. A trailer truck having a body frame, a draw bar permanently mounted thereon, and an axle having swiveled carrying wheels, in combination with a steering lever pivoted on a vertical axis on said axle and connected to said wheels, a second lever pivotally attached to the first lever adapted to swing laterally therewith and also to swing up and down thereon, means for detachably connecting the second lever to said draw bar in longitudinally sliding engagement, a bracket rigidly attached to said axle having an upwardly projecting member thereon arranged to engage a recess in said second lever when detached from the draw bar, and a sliding bolt adapted to pass through said second lever and projection when in engagement, to lock said steering lever and wheels in fixed position.

6. A trailer truck having, in combination, a body frame, a draw bar pivotally mounted thereon, an axle equipped with dirigible wheels, a steering lever pivoted on said axle to swing on a vertical axis and connected to said wheels, a second lever pivotally attached to the steering lever to swing the latter on its axis and also to swing up and down with relation to said steering lever, means for locking the free forward end of the second lever to said draw bar comprising interfitting parts on the lever and draw bar arranged to be detachably engaged, and a hand lever having means to cooperate with the said part on said second lever and provide a rigid inflexible extension for the second lever to permit of swinging the latter from a point beyond the end of said body frame.

In testimony whereof, I have hereunto set my hand.

ADDI BENJAMIN CADMAN.